United States Patent
Fallas et al.

(12) 
(10) Patent No.: US 6,252,181 B1
(45) Date of Patent: Jun. 26, 2001

(54) METHOD AND APPARATUS FOR WEIGHING A PRODUCT

(76) Inventors: Richard J. Fallas, 335 Harrowgrove Ct., Alpharetta, GA (US) 30022; David M. Fallas, 3120 Inverness Dr., Waco, TX (US) 76710

(*) Notice: Subject to any disclaimer, the term of this patent is extended or adjusted under 35 U.S.C. 154(b) by 0 days.

(21) Appl. No.: 09/366,917

(22) Filed: Aug. 4, 1999

(51) Int. Cl.$^7$ ............................ G01G 13/02; G01G 19/00
(52) U.S. Cl. ............................................ 177/119; 177/145
(58) Field of Search .................................. 177/119, 145, 177/146

(56) References Cited

U.S. PATENT DOCUMENTS

| | | | |
|---|---|---|---|
| 2,235,725 | 3/1941 | Nordquist | 209/121 |
| 2,597,069 | * 5/1952 | Conti | 265/27 |
| 2,849,116 | 8/1958 | Fried | 209/121 |
| 2,905,310 | 9/1959 | Stoeckel et al. | 198/39 |
| 3,481,465 | 12/1969 | Way | 209/74 |
| 3,736,997 | * 6/1973 | Bottorf | 209/556 |
| 3,955,665 | * 5/1976 | Pettis | 198/139 |
| 3,974,888 | 8/1976 | Murakami et al. | 177/52 |
| 4,137,977 | * 2/1979 | Alger | 177/146 |
| 4,344,493 | * 8/1982 | Salmonsen | 177/52 |
| 4,901,808 | 2/1990 | Wu | 177/145 |
| 5,088,569 | 2/1992 | Checcucci | 177/145 |
| 5,244,100 | * 9/1993 | Regier | 209/556 |
| 5,306,877 | 4/1994 | Tas | 177/145 |
| 5,308,930 | 5/1994 | Tokutu et al. | 177/25.13 |
| 5,369,222 | * 11/1994 | Strelioff | 177/136 |
| 5,383,561 | 1/1995 | Tokutu | 209/645 |

* cited by examiner

*Primary Examiner*—Diego Gutierrez
*Assistant Examiner*—Jacob Eastman
(74) *Attorney, Agent, or Firm*—Needle & Rosenberg, P.C.

(57) ABSTRACT

Method and apparatus for weighing a product being moved by a conveyor. When the product is conveyed to be disposed at a weighing station stationarily positioned relative to the moving conveyor, a weighing platform engages the bottom surface of the product and raises the product upwardly so that the bottom surface of the product is disposed above and spaced apart from the conveyor. After the product is raised above the conveyor, the product is weighed, without any interface with the conveyor, and then lowered back down onto the conveyor. Concurrently, the measured weight of the product is compared to a predetermined weight range. If the weight of the product is properly within a predetermined weight range, the product continues down the production line on the conveyor. If, however, the weight of the product is out of tolerance, the unacceptable product is removed from the conveyor.

9 Claims, 4 Drawing Sheets

METHOD AND APPARATUS FOR WEIGHING A PRODUCT

BACKGROUND OF THE INVENTION

1. Field of the Invention

The present invention relates to a method and apparatus for weighing products and, more particularly, for weighing products that are moved using a conveyor by first lifting the product above the conveyor and then measuring the weight of the lifted product.

2. Background Art

Quality control has always been integral to successful operation of an industrial manufacturing and shipping facility. It is, obviously, important to provide the customer with the correct quantity of goods both for the customer's satisfaction and for the highest possible efficiency of the facility. A common method for ensuring that the correct quantity of goods are loaded and shipped to the customer is by weighing the box or container in which the goods are packed.

Many of the packaging lines currently used rely heavily on automation and less on human intervention. However, since there are occasions when the wrong amount of a product is placed into a bag, carton, or other container, or the wrong number of bags, cartons, or other containers are loaded into the final shipping container, a product weigher is a way to ensure that the correct product weight is being shipped to the customer.

There are a number of prior art devices used to weigh the shipping containers on a packaging line. These commercially-available devices often consist of a conveyor belt approximately thirty inches long and twenty inches wide. As the shipping container traverses over load cells below the conveyor at a weighing station, the load cells transmit to a main control board the weight of the conveyor plus any product being conveyed. Digital filters located on the main control board filter out dynamic signals that occur as a result of weighing a moving object.

However, when measurements are taken on a moving conveyor belts, as in the prior art systems, complex digital filtering must be applied to the analog signal to remove dynamic components in the signal. These systems often are very proprietary to the equipment manufacturer and are not easily understood by the end user. Moreover, the prior art systems are difficult to interface with other equipment and supervisory data collection computers. Still another problem is that since the conveyor is part of the load being weighed, the conveyor must be made as light as possible, resulting in a conveyor design that, in many cases, does withstand an industrial environment well.

SUMMARY OF THE INVENTION

The present invention encompasses a method and apparatus for weighing, a product in an industrial environment that overcomes the drawbacks in the prior art. The product is moved by a conveyor to be disposed at a weighing station, which is stationarily positioned relative to the moving conveyor. There, a weighing platform, preferably formed by a plurality of fingers, engages the bottom surface of the product and raises the product upwardly so that the bottom surface of the product is disposed above and spaced apart from the conveyor. After the product is raised above the conveyor, the product is weighed without any interface with the conveyor to obtain a highly accurate measurement.

After the product is weighed, it is then lowered back down onto the conveyor. Concurrently, the measured weight of the product is preferably compared to a predetermined weight range to determine whether the product is acceptable to ship to the customer. If the weight of the product is properly within the predetermined weight range, the product continues down the production line on the conveyor. If, however, the weight of the product is out of tolerance, the unacceptable product is removed from the conveyor, such as by pushing it laterally off to the side.

One difference between the present invention and prior art weighing devices is that the weighing platform is stationary relative to the conveyor and the product is stationary when the actual weight measurements are taken. Since the conveyor is not part of the load being weighed, the conveyor itself can be constructed of standard, heavy duty, industrial components, such as bearings, motors, rollers, and the like, used in most industrial conveyor designs.

In addition, the weighing station of the present invention does not require sophisticated digital filtering techniques used by prior art designs. In fact, the present invention allows the weighing device to utilize the versatility and commercial acceptance of a programmable logic controller ("PLC"). The PLC has been widely used in industrial automation for the past few decades, so the majority of control technicians and engineers in factories are familiar with programming and troubleshooting PLCs. Of course, if desired, the present invention can also be used with digital systems for filtering and weighing the product.

Still another advantage of the present invention over the prior art is that the weighing platform is positioned below the top surface of the conveyor in the lowered position, protecting the load cells from damage in an overload condition. If too much weight is applied to any load cell when the weighing platform raises the product above the conveyor, the PLC generates an alarm, causing the weighing station to shut down. The platform then lowers by the force of gravity to fall below the surface of the conveyor so that the overweight product is again supported by the conveyor, not the weighing platform and load cells.

DETAILED DESCRIPTION OF THE INVENTION

The present invention is more particularly described in the following examples that are intended as illustrative only since numerous modifications and variations therein will be apparent to those skilled in the art. As used in the specification and in the claims, "a" can mean one or more, depending upon the context in which it is used. The preferred embodiment is now described with reference to the figures, in which like numbers indicate like parts throughout the figures.

Referring generally to FIGS. 1–4, the present invention accurately determines the weight of a product P. An appropriate environment for the present invention is in an industrial setting, such as weighing products moving along a conveyor line C. An example of a product P with which the present invention is well suited is a container, such as a box, filled with a certain number of bags, cartons, or other materials. Since occasionally the wrong amount of material is put into the container, the present invention weighs the container to ensure that its weight falls within predetermined values and, if not, to remove the product P from the conveyor line C.

Figure 1:
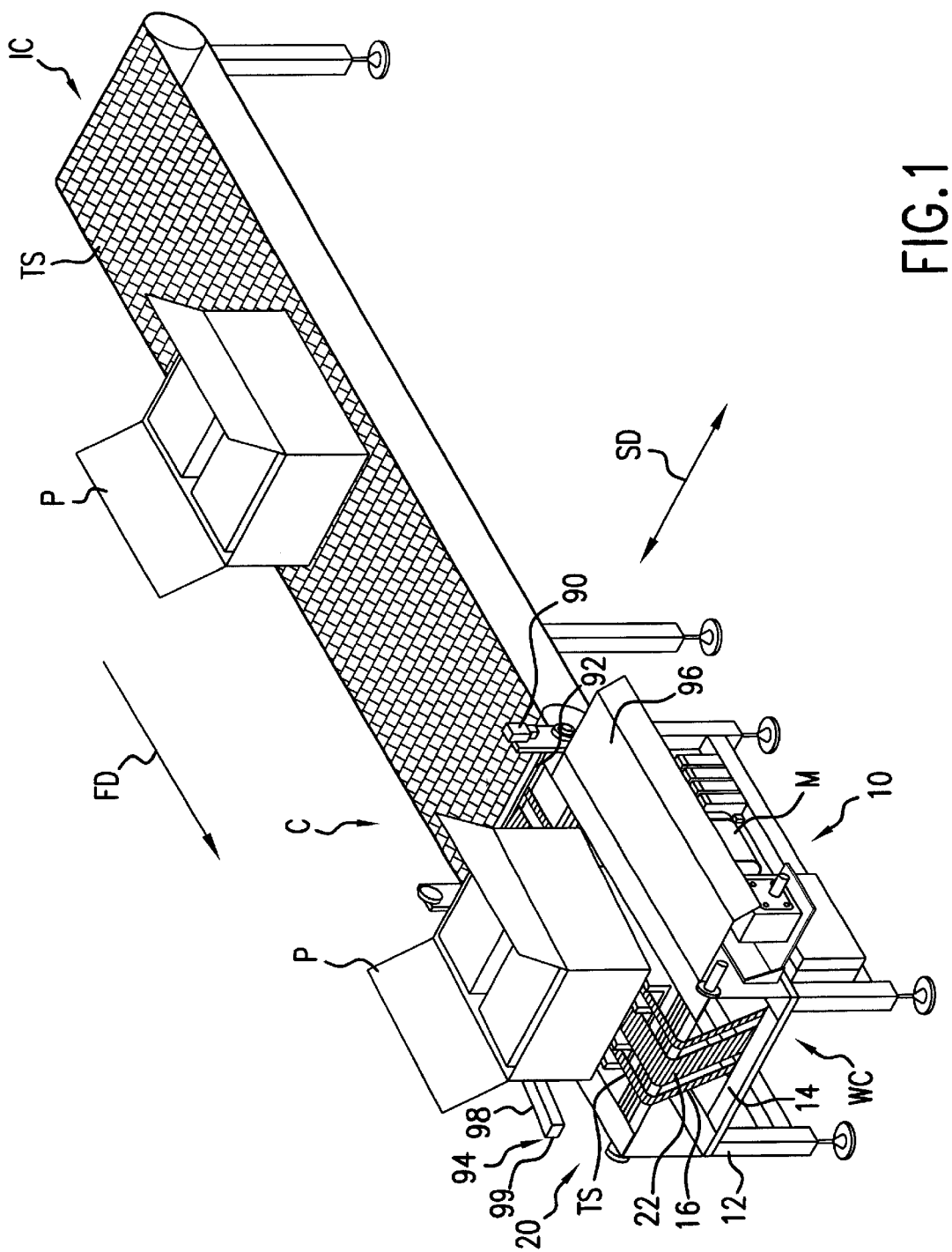
FIG. 1 is a perspective view of one embodiment of a weighing station of the present invention, in which one product is being lifted above the conveyor and is weighed while the upstream product continues to move toward the weighing station by an infeed conveyor.

Now referring specifically to FIG. 1, the upstream conveyor, which is referred to as an infeed conveyor IC, moves the product P to a weighing station 10 of the present invention. As illustrated, the infeed conveyor IC terminates adjacent the beginning of the weighing station conveyor WC so that the product P smoothly transfers between the two conveyors C. The illustrated conveyors include a motor M mechanically coupled to the conveyor WC and a power source, such as an electrical outlet or other electrical power supply, to energize the motor M that generates an output to move the top surface TS of the conveyor WC in a first direction FD. One skilled in the art will appreciate that numerous different designs of conveyors can be used, and that the conveyors shown in FIG. 1 are illustrative of common designs. Alternatively, for example, the conveyors can be a series of parallel, spaced apart rollers (not shown) and the product can either move by the force of gravity or a motor can turn the rollers at a desired rotation rate.

The conveyors C move the product P in the first direction FD and have a top surface TS on which the product P is disposed. Once the conveyors C transport the product P to the weighing station 10, a weighing apparatus 20 determines its weight. The weighing apparatus 20 uses a weigher 22, or weighing platform, stationarily positioned relative to the moving conveyor WC. The weigher 22 includes at least one finger 30 to support the product P above the conveyor WC, a lifter 70 to move the fingers 30 upwardly and downwardly, and at least one weighing element 80 operably connected to the fingers 30. The weigher 22 and weighing station conveyor WC are mounted to and supported by a main frame 12.

Figure 2:
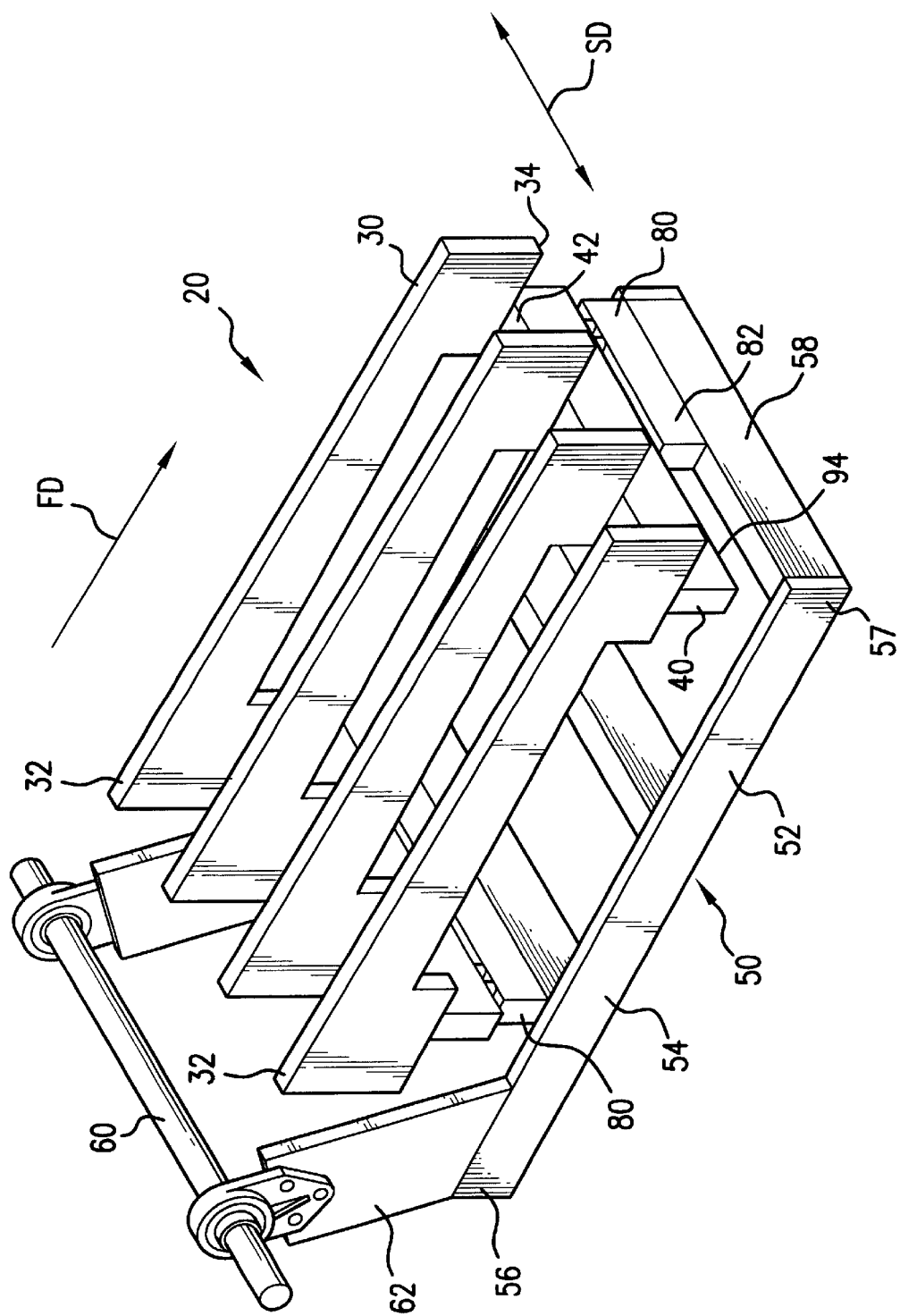
FIG. 2 is a perspective view of a weighing platform shown in FIG. 1.
Figure 3:
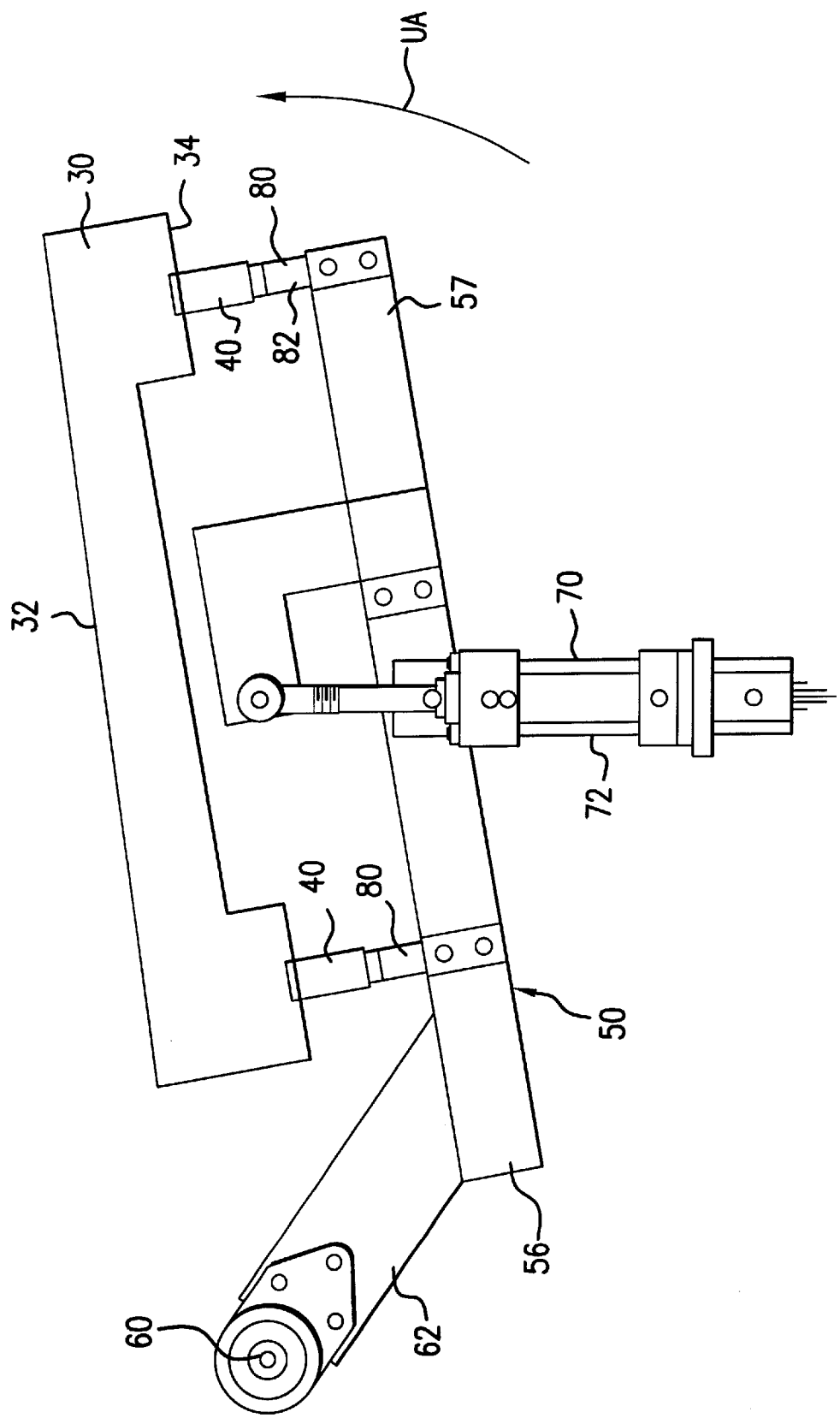
FIG. 3 is a side view of the weighing platform shown in FIG. 2 with the addition of a pneumatic cylinder, in which the weighing platform is in the raised position.
Figure 4:
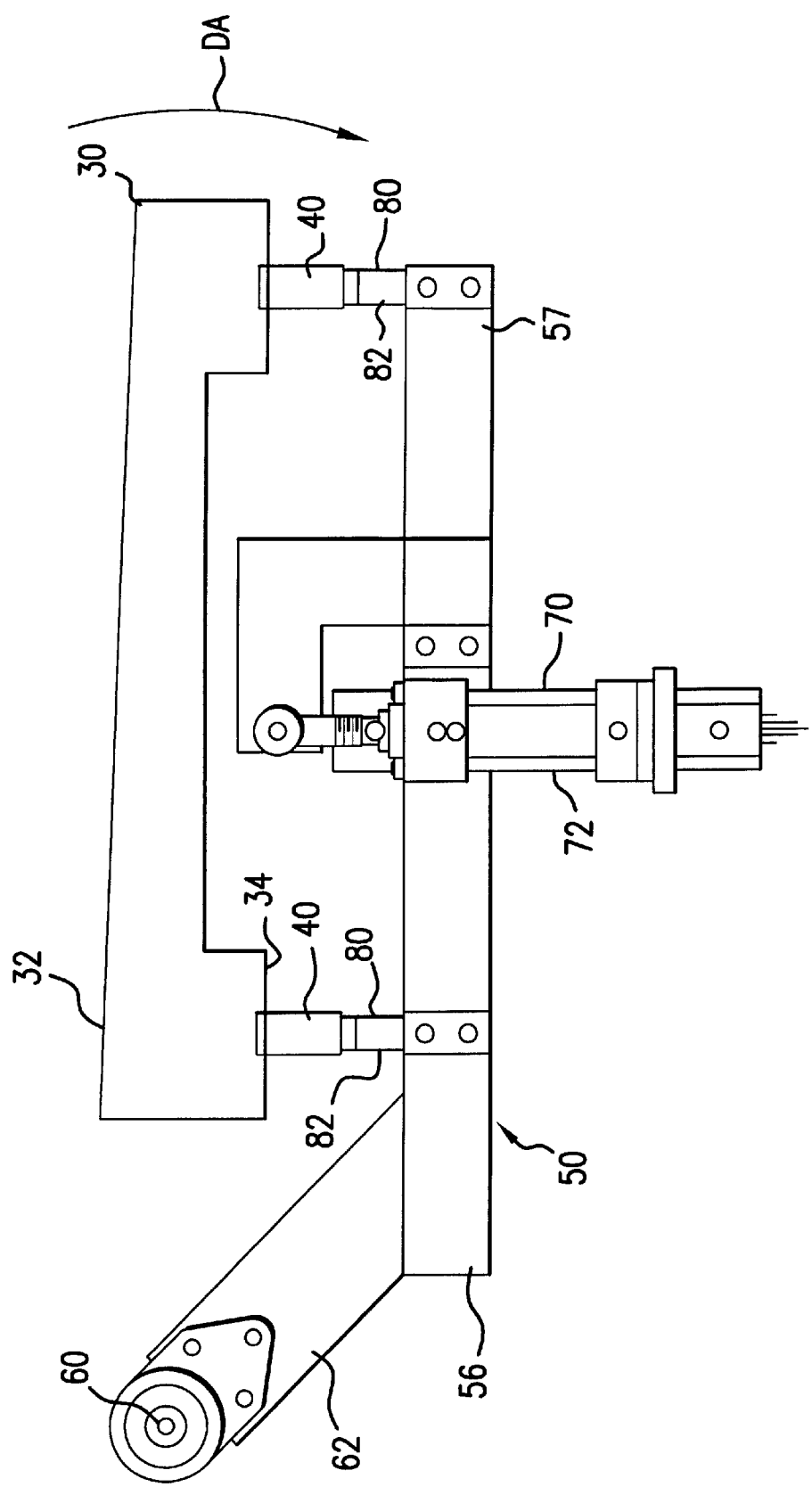
FIG. 4 is a side view of the weighing platform shown in FIG. 3, in which the weighing platform is in the lowered position.

As best shown in FIGS. 2–4, the fingers 30 each have a lower surface 34 and an opposed upper surface 32, which supports the product P thereon. The illustrated fingers 30 are elongated and extend in the first direction FD. One skilled in the art will appreciate that the fingers 30 can take other shapes that are capable of supporting the product P thereon, such as the upper surface 32 only extending a short length in the first direction FD or having an upper surface 32 that is sized to complementarily receive the product P therein if, for example, the product is spherical or cylindrical. It is also contemplated using only a single finger, instead of a plurality of fingers, if such a design is sufficient to support the product P.

The lifter 70 moves the fingers 30 between a raised position (shown in FIGS. 1 and 3), in which the upper surface 32 of each of the fingers 30 is disposed above the top surface TS of the conveyor WC, and a lowered position (shown in FIG. 4). In the lowered position, the upper surface 32 of each of the fingers 30 is disposed below the top surface TS of the conveyor WC or at the same height as the top surface TS so that the product P can move downstream in the first direction FD unimpeded by the fingers 30. When in the raised position, the product P is elevated to be spaced apart from the top surface TS of the conveyor WC so that the product P remains stationary relative to the conveyor WC, which may continue to move during the weighing process.

Referring now to FIGS. 3 and 4, one embodiment of the lifter 70 is a pneumatic cylinder 72 that extends to move the fingers 30 to the raised position and retracts to move the fingers 30 to the lowered position. Other contemplated lifters include hydraulic cylinders, rodless cylinders, electric solenoids, a cam, and the like.

Referring again to FIGS. 2–4, the weighing element 80, which is preferably a load cell 82, determines the weight of the product P when disposed on the fingers 30 and when the lifter 70 positions the upper surfaces 32 of the fingers 30 in the raised position above the top surface TS of the conveyor WC. As discussed in more detail below, the weigher 22 preferably compares the weight measurement to determine if the weight is between an acceptable upper and lower limit. Once the comparison occurs, the product P is allowed to continue down the conveyor line C for shipping or further processing if the product weight is within the predetermined limits. If the product weight is outside of the limits, the product P is rejected and laterally pushed off of the side of the conveyor WC, instead of being shipped.

Referring back to FIG. 1 to discuss in more detail the illustrated embodiment, the weighing station conveyor shown WC comprises three endless belts 14. The top surfaces TS of the belts 14 are substantially planar and parallel when the product P is disposed thereon. Each belt 14 has two opposed side edges 16, in which the edges 16 of each belt 14 are spaced apart from the edges 16 of the other belts 14. One finger 30 of the weigher 22 is disposed adjacent each edge 16 of each belt 14 so that there are four fingers 30, two positioned in the two gaps formed between two spaced apart belts 14 and two positioned adjacent the outer side edges 16 of the two outer belts 14. The four spaced apart fingers 30 are best shown in FIG. 2.

Still referring to FIG. 2, the fingers 30 further comprise at least one bar 40, which extends in a second direction SD that is perpendicular to the first direction FD. The bar 40 has an uppermost surface 42 and a lowermost surface 44, in which the uppermost surface 42 extends substantially parallel to the upper surfaces 32 of the fingers 30 and substantially parallel to the top surface TS of the conveyor WC when the fingers 30 are in the lowered position. The lower surface 34 of each finger 30 is secured to the uppermost surface 42 of the bar 40. In conjunction, the weighing element 80 is operably connected to the lowermost surface 44 of the bar 40.

The illustrated embodiment further includes a support platform 50 that comprises a frame 52, which is coupled to the fingers 30, and a pivot shaft 60. The support platform 50 includes a plurality of braces 54 extending in the first direction FD and at least two crosspieces 58 fixedly attached to the braces 54. Each brace 54 has a first end 56 and an opposed second end 57. The crosspieces 58 extend laterally relative to the braces 54 in the second direction SD and are oriented substantially parallel to the bar 40.

The pivot shaft 60 also extends in the second direction SD and is connected to the first ends 56 of the braces 54. As shown in FIG. 2, an extender 62 interconnects the pivot shaft 60 and the first ends 56 of the braces 54. It is possible to use other designs to interconnect the first end 56 of the braces 54 to the pivot shaft 60, but, regardless of the design chosen, the pivot shaft 60 is preferably stationarily positioned.

When the lifter 70 moves the fingers 30 between the raised and lowered positions, the fingers 30 and connected frame 52 pivot about the pivot shaft 60. That is, the lifter 70, a pneumatic cylinder 72 in this embodiment, is connected to the frame 52 and extends to pivot the first ends 56 of the braces 54 about the pivot shaft 60 in an upward arc UA and move the fingers 30 to the raised position, which is shown in FIG. 3. After the weighing of the product P occurs, the cylinder retracts, as shown in FIG. 4, to pivot the first ends 56 of the braces 54 about the pivot shaft 60 in a downward arc DA to move the fingers 30 to the lowered position.

Referring to FIGS. 2–4, the weighing element 80 is disposed intermediate the frame 52 and the bar 40 so that the fingers 30 and bar 40 are supported only by the weighing element 80. The weighing element 80 preferably comprises at least one load cell 82 and, as shown best in FIG. 2, includes two load cells. Other designs are contemplated, such as using four load cells, or, alternatively, using LVDTs or similar equipment.

Also, although not shown, one skilled in the art will appreciate that other designs can be used instead of the support platform 50 pivoted by the cylinder 72 about the pivot shaft 60 to move the fingers 30 between the raised and lowered positions. Examples include raising and lowering the fingers 30 vertically on linear bearings (not shown) or with a parallel linkage mechanism (not shown).

In operation, the conveyor C moves the product P in the first direction FD to be disposed at the weighing station 10, which is stationarily positioned relative to the moving conveyor C. Referring again to FIG. 1, a photocell 90 detects the dark to light transition of the back edge of the product P as and after the product P passes by the photocell 90. This detection signal is sent to an industrial programmable logic controller ("PLC") (not shown) or another type of controller known in the art, which starts a delay timer (not shown). Once the delay timer has timed out, the PLC energizes a weighing platform pneumatic cylinder solenoid valve (not shown) to operate the pneumatic cylinder 72, causing the fingers 30 to engage the bottom surface of the product P at the weighing station 10 and raise upwardly so that the bottom surface of the product P is disposed above and spaced apart from the top surface TS of the conveyor WC. Thus, the product P is lifted off of the conveyor belts 14 by the fingers 30 and comes to a stop supported entirely by the fingers 30 above the conveyor WC.

Concurrently, as the PLC signals the weighing platform pneumatic cylinder solenoid valve to energize and raise the fingers 30, another solenoid valve (not shown) for a holdback plate 92 is also energized, causing the holdback plate 92 to raise upwardly above the top surface TS of the infeed conveyor IC. The holdback plate 92 is shown in FIG. 1 immediately upstream of the weighing station 10. This holdback plate 92 prevents the next sequential product P from entering the weighing station 10 while the fingers 30 are in the raised position. However, under normal operating conditions, the spacing between products is such that the holdback plate 92 is not required, but is nevertheless still preferred for instances in which the products are unevenly spaced on the infeed conveyor IC.

After the product P is raised above the conveyor WC as shown in FIG. 1, the product P is weighed. However, before performing the weighing step in the illustrated embodiment, a proximity sensor (not shown) preferably detects when the air cylinder has fully extended, which starts a settling timer (not shown). Once the settling timer has timed out indicating that the load cell signals have stabilized in approximately 0.5 seconds, the weigh timer (not shown) begins. The load cells 82, which are compressed by the weight of the product, produce a millivolt signal proportional to strain corresponding to the load being applied. This signal is then converted to a ±10 Volt DC signal by a commercially available analog amplifier and filtered to reduce any mechanical noise. The filtered and amplified 10-Volt signal is then fed into an analog input channel of the PLC.

Every ten (10) milliseconds while the weigh timer is timing, the analog values from the two load cells 82 are sampled. The current measured value is added to the previous values and divided by the number of samples to obtain an average value, or average weight. Approximately twelve samples are taken in the presently preferred embodiment.

After the weighing step is completed and all of the samples are taken, the lifter 70 lowers the fingers 30 so that the bottom surface of the product P is again disposed on and supported by the top surface TS of the conveyor WC. Specifically, when the weigh timer has timed out, the PLC signals the cylinder 72 to retract, thus lowering the fingers 30 and correspondingly lowering the product. Also, when the weighing platform pneumatic cylinder solenoid valve de-energizes, the solenoid valve for the holdback plate 92 correspondingly causes the holdback plate 92 to move downwardly as the fingers 30 to move to the lowered position.

The weight of the product P from the weighing step is also preferably compared to a predetermined weight range. That is, the measured weight is compared to a preset overweight value and preset underweight value. If the measured weight is within tolerance, the product P is allowed to continue down the conveying line C.

Alternatively, if the measured weight is out of tolerance (i.e., more than the overweight value or less than the underweight value), the product P is rejected by removing the product P from the weighing station conveyor WC. Referring again to FIG. 1, a reject mechanism 94 pushes the product P having an out-of-tolerance weight laterally off of the main frame 12 and onto a table 96 or other device to receive the rejected product. The reject mechanism 94 is supported by the main frame 12 and includes a pusher member 98 having a free end 99. A pusher member cylinder (not shown), or similar moving means, pivots the pusher member 98 laterally back and forth relative to the conveyor WC. Once the weight of the product P is calculated to be outside the acceptable range, the pusher member cylinder energizes to pivot the free end 99 of the pusher member 98 to move across the conveyer, pushing the product P laterally off of the conveyor line C and onto the table 96. The pusher member 98 can either laterally push the product P to the side when the product P is lowered back onto the top surface TS of the weighing station conveyor WC or when the product P is on the fingers 30 in the raised position. Also, the holdback plate 92 remains in the raised position until the pusher member 98 has completed moving the out-of-tolerance product off of the weighing station conveyor WC and the pusher member 98 has pivoted back to its initial position so its length is oriented in the first direction FD, which is shown in FIG. 1.

It is advantageous that the fingers 30 are located below the top surface TS of the conveyor WC in the lowered position, potentially protecting the load cells 82 in the event of an overload condition. If too much weight is applied to the load cells 82, the PLC generates an alarm, shutting down the weighing station 10. The fingers 30 then lower by the force of gravity beneath the top surface TS of the conveyor WC, protecting the equipment from damage.

The present invention also contemplates other designs and embodiments. For example, the present invention can effectively be used in a situation in which loose materials are loaded into a container for shipping or for further processing. In this scenario, the weigher 22 of the present invention can be used. However, the container will initially be empty or only partially filled. For the empty container scenario, the container is conveyed onto the weighing station 10 and raised, as described above. The initial weight is taken as the zero weight. Materials are then be metered into the container by a variable speed conveyor belt (not shown) located above the weighing station 10. The weigher 22 preferably averages the weight of the container approximately five times per second during the filling process. Initially, the variable speed metering belt will run at maximum filling speed. As the net weight of the container approaches the desired weight, the speed of the metering belt is reduced. When the target weight is reached, a stop gate extends between the discharge of the metering belt and the top of the container to cease the flow of the material into the container. The container is then lowered and moved along the conveyor for additional processing or shipping.

One skilled in the art will also appreciate that the present invention can be integrated to perform other functions or provide additional data for evaluation. For example, it is contemplated that bar code scanners (not shown) can be interfaced with the weighing station 10 to load immediately and automatically the acceptable weights for the product when the bar code on the product is read. Similarly, records of accepts and rejects can be maintained to locate recurring problems, or the system can transmit production data to other integrated information systems. Still another option is to communicate that the specific product is outside the weight tolerances to an information system so that the product can later be removed downstream of the weighing station 10, instead of potentially slowing the pace of operations at the weighing station by using the embodiment employing the reject mechanism 94 described above.

Although the present invention has been described with reference to specific details of certain embodiments thereof, it is not intended that such details should be regarded as limitations upon the scope of the invention except as and to the extent that they are included in the accompanying claims.

What is claimed is:

1. A weighing apparatus, comprising:
   a. a conveyor for moving a product in a first direction, the conveyor having a top surface on which the product is disposed;
   b. a weigher stationarily positioned relative to the moving conveyor, the weigher comprising:
      1. at least one finger having an upper surface and a lower surface and being elongated and extending in the first direction;
      2. a lifter for moving each finger between a raised position, in which a portion of the upper surface of each finder is disposed above the top surface of the conveyor, and a lowered position, in which the upper surface of each finger is disposed below the top surface of the conveyor;
      3. at least one weighing element operably connected to each finger, in which the weighing element determines the weight of the product when disposed on the finger and when the lifter positions the finger in the raised position; and
      4. at least one bar, the bar extending in a second direction that is perpendicular to the first direction, the bar having an uppermost surface and a lowermost surface, the uppermost surface extending substantially parallel to the upper surface of each finger, wherein the lower surface of each finger is secured to the uppermost surface of the bar, the weighing element being operably connected to the lowermost surface of the bar; and
   c. a support platform comprising:
      1. a frame coupled to each finger, the frame including a plurality of braces extending in the first direction and at least two crosspieces extending in the second direction and oriented substantially parallel to the bar, the braces being fixedly attached to the crosspieces, each brace having a first end; and
      2. a pivot shaft extending in the second direction and connected to the first ends of the braces, the pivot shaft being stationarily positioned so that when the lifter moves each finger between the raised and lowered positions, each finger and connected frame pivot about the pivot shaft.

2. The weighing apparatus of claim 1, wherein the weighing element is disposed intermediate the frame and the bar so that each finger and the bar are supported only by the weighing element.

3. The weighing apparatus of claim 1, wherein the lifter comprises a pneumatic cylinder connected to the frame, in which the cylinder extends to pivot the first ends of the braces about the pivot shaft in an upward arc and move each finger to the raised position and in which the cylinder retracts to pivot the first ends of the braces about the pivot shaft in a downward arc to move each finger to the lowered position.

4. A weighing apparatus, comprising:
   a. a conveyor for moving a product in a first direction, the conveyor having a top surface on which the product is disposed; and
   b. a weigher stationarily positioned relative to the moving conveyor, the weigher comprising:
      1. at least one finger having an upper surface to support the product thereon;
      2. lifting means for moving each finger between a raised position, in which a portion of the upper surface of each finger is disposed above the top surface of the conveyor, and a lowered position, in which the upper surface of each finger is disposed below the top surface of the conveyor;
      3. at least one bar, the bar extending in a second direction that is perpendicular to the first direction, the bar having an uppermost surface and a lowermost surface, the uppermost surface extending substantially parallel to the upper surface of each finger, wherein the lower surface of each finger is secured to the uppermost surface of the bar, the weighing element being operably connected to the lowermost surface of the bar; and
      4. weighing means for determining the weight of the product when the lifting means positions each finger in the raised position, the weighing means operably connected to the lowermost surface of the bar; and
   c. a support platform comprising:
      1. a frame coupled to each finger, the frame including a plurality of braces extending in the first direction and at least two crosspieces extending in the second direction and oriented substantially parallel to the bar, the braces being fixedly attached to the crosspieces, each brace having a first end; and
      2. a pivot shaft extending in the second direction and connected to the first ends of the braces, the pivot shaft being stationarily positioned so that when the lifter moves each finger between the raised and lowered positions, each finger and connected frame pivot about the pivot shaft.

5. The weighing apparatus of claim 4, wherein the weighing means is disposed intermediate the frame and the bar so that each finger and the bar are supported only by the weighing means.

6. The weighing apparatus of claim 4, wherein the lifting means comprises a pneumatic cylinder connected to the frame, in which the cylinder extends to pivot the first ends of the braces about the pivot shaft in an upward arc and move each finger to the raised position and in which the cylinder retracts to pivot the first ends of the braces about the pivot shaft in a downward arc to move each finger to the lowered position.

7. A method of weighing a product having a bottom surface, comprising the steps of:
   a. moving the product by a conveyor in a first direction to be disposed at a weighing station which is stationarily positioned relative to the moving conveyor, the conveyor having a top surface on which the product is disposed;
   b. engaging the bottom surface of the product with at least one finger at the weighing station, the finger having an upper surface and a lower surface and being elongated and extending in the first direction, the weighing station further comprising:
      1. a lifter for moving each finger between a raised position, in which a portion of the upper surface of each finger is disposed above the top surface of the conveyor, and a lowered position, in which the upper surface of each finger is disposed below the top surface of the conveyor;
      2. at least one bar, the bar extending in a second direction that is perpendicular to the first direction, the bar having an uppermost surface and a lowermost surface, the uppermost surface extending substantially parallel to the upper surface of each finger, wherein the lower surface of each finger is secured to the uppermost surface of the bar, the weighing element being operably connected to the lowermost surface of the bar;
      3. a frame coupled to each finger, the frame including a plurality of braces extending in the first direction and at least two crosspieces extending in the second direction and oriented substantially parallel to the bar, the braces being fixedly attached to the crosspieces, each brace having a first end; and
      4. a pivot shaft extending in the second direction and connected to the first ends of the braces, the pivot shaft being stationarily positioned so that when the lifter moves each finger between the raised and lowered positions, each finger and connected frame pivot about the pivot shaft;
   c. raising each finger upwardly so that the bottom surface of the product is disposed above and spaced apart from the top surface of the conveyor;
   d. after the raising step, weighing the product; and
   e. after the weighing step, lowering each finger so that the bottom surface of the product is disposed on and supported by the top surface of the conveyor.

8. The method of claim 7, further comprising the steps of:
   a. comparing the weight of the product from the weighing step to a predetermined weight range; and
   b. removing the product from the conveyor if the product is different from the predetermined weight range.

9. A weighing apparatus, comprising:
   a. a conveyor for moving a product in a first direction, the conveyor having a top surface on which the product is disposed;
   b. a weigher stationarily positioned relative to the moving conveyor, the weigher comprising:
      1. at least one finger having an upper surface and a lower surface and being elongated and extending in the first direction;
      2. a lifter for moving each finger between a raised position, in which a portion of the upper surface of each finger is disposed above the top surface of the conveyor, and a lowered position, in which the upper surface of each finger is disposed below the top surface of the conveyor;
      3. at least one weighing element operably connected to each finger, in which the weighing element determines the weight of the product when disposed on the finger and when the lifter positions the finger in the raised position; and
      4. at least one bar, the bar extending in a second direction that is perpendicular to the first direction, the bar having an uppermost surface and a lowermost surface, the uppermost surface extending substantially parallel to the upper surface of each finger, wherein the lower surface of each finger is secured to the uppermost surface of the bar, the weighing element being operably connected to the lowermost surface of the bar; and
   c. a support platform comprising:
      1. a frame coupled to each finger, the frame including a plurality of braces extending in the first direction and at least one crosspiece extending in the second direction and oriented substantially parallel to the bar, the braces being fixedly attached to the crosspiece, each brace having a first end; and
      2. a pivot shaft extending in the second direction and connected to the first ends of the braces, the pivot shaft being stationarily positioned so that when the lifter moves each finger between the raised and lowered positions, each finger and connected frame pivot about the pivot shaft.

* * * * *